US007467269B2

(12) United States Patent
Zimoto et al.

(10) Patent No.: US 7,467,269 B2
(45) Date of Patent: Dec. 16, 2008

(54) STORAGE APPARATUS AND STORAGE APPARATUS CONTROL METHOD

(75) Inventors: Yoshifumi Zimoto, Odawara (JP); Ikuya Yagisawa, Machida (JP); Atsushi Ishikawa, Minamiashigara (JP)

(73) Assignee: Hitachi, Ltd., Tokyo (JP)

( * ) Notice: Subject to any disclaimer, the term of this patent is extended or adjusted under 35 U.S.C. 154(b) by 237 days.

(21) Appl. No.: 11/498,171

(22) Filed: Aug. 3, 2006

(65) Prior Publication Data
US 2007/0288712 A1 Dec. 13, 2007

(30) Foreign Application Priority Data
Jun. 9, 2006 (JP) ............... 2006-161484

(51) Int. Cl.
*G06F 12/00* (2006.01)

(52) U.S. Cl. ..................................... 711/162

(58) Field of Classification Search .................. 711/162
See application file for complete search history.

(56) References Cited

U.S. PATENT DOCUMENTS

| 7,222,172 | B2* | 5/2007 | Arakawa et al. ............ 709/224 |
| 2004/0103254 | A1* | 5/2004 | Satoyama et al. ........... 711/150 |
| 2006/0031648 | A1 | 2/2006 | Ishikawa et al. |
| 2007/0204119 | A1* | 8/2007 | Murotani et al. ........... 711/161 |
| 2007/0288712 | A1* | 12/2007 | Zimoto et al. ............... 711/162 |
| 2008/0092143 | A1* | 4/2008 | Koseki et al. ............... 718/105 |

FOREIGN PATENT DOCUMENTS

| JP | 2003-241905 | 2/2002 |
| JP | 2006-053601 | 8/2004 |

* cited by examiner

*Primary Examiner*—Brian R Peugh
(74) *Attorney, Agent, or Firm*—Reed Smith LLP; Stanley P. Fisher, Esq.; Juan Carlos A. Marquez, Esq.

(57) ABSTRACT

Proposed is a storage apparatus and its control method capable of performing dynamic load balancing or performance acceleration as a whole by balancing the load to a logical volume. With this storage apparatus, the load status of the volume is measured based on the data volume and command throughput transferred between the higher-level device and the storage unit. In addition, the contents of the volume having a load exceeding the default value are copied to one or more backup volumes based on the measurement results of the load status of the volume, the volume of a copy source and the backup volume of a copy destination are associated with one virtual volume, and the virtual volume is provided to the higher-level device. Moreover, when a write request involving read processing for reading data from the virtual volume is given from the higher-level device, data is read from a default volume or the backup volume associated with the virtual volume and data from the higher-level device is written in all the volumes and backup volumes associated with the virtual volume, and, when a read request for reading data from the virtual volume is given, corresponding data is read from the volume or the backup volume other than the default volume or backup volume among the volume and the backup volume associated with the virtual volume.

12 Claims, 10 Drawing Sheets

FIG.3

| VIRTUAL LU NUMBER | MAPPING NUMBER | REAL LU NUMBER | | | | |
|---|---|---|---|---|---|---|
| LU0 | 1 | LU0 | Null | Null | Null | Null |
| LU1 | 1 | LU1 | Null | Null | Null | Null |
| LU2 | 3 | LU2 | LU3 | LU4 | Null | Null |
| ⋮ | ⋮ | ⋮ | ⋮ | ⋮ | ⋮ | ⋮ |
| LUn | 0 | Null | Null | Null | Null | Null |

| REAL LU NUMBER | NUMBER OF PROCESSING COMMANDS PER UNIT TIME | PROCESSED DATA VOLUME PER UNIT TIME |
|---|---|---|
| LU0 | $a_0$ | $b_0$ |
| LU1 | $a_1$ | $b_1$ |
| ⋮ | ⋮ | ⋮ |
| LUn | $a_n$ | $b_n$ |

31 — 32 — 33

30

| BACKUP EXTENT IN-USE REAL LU NUMBER | COPY OR REAL LU NUMBER |
|---|---|
| LU3 | LU2 |
| LU4 | LU2 |
| ⋮ | ⋮ |
| Null | Null |

STORAGE APPARATUS AND STORAGE APPARATUS CONTROL METHOD

CROSS-REFERENCES TO RELATED APPLICATIONS

This application relates to and claims priority from Japanese Patent Application No. 2006-161484, filed on Jun. 9, 2006, the entire disclosure of which is incorporated herein by reference.

BACKGROUND

The present invention generally relates to a storage apparatus and a storage apparatus control method, and in particular can be suitably employed for balancing the load from a host system to a logical unit.

In the recent trend of storage consolidation with Web servers and contents distribution, storage apparatuses are shared based on a plurality of applications or contents, and systems unable to anticipate the load status against the logical volume of the storage apparatus based on the respective applications and the like are increasing.

Under these circumstances, in recent years, in order to improve the throughput of the storage apparatus, a method has been proposed for improving the throughput by storing data of a certain logical unit in another logical unit so as to enable the referral from a logical unit storing much information (refer to Japanese Patent Laid-Open Publication No. 2003-241905).

Further proposed is a method for balancing the load from a host by measuring the load status of a logical volume as a logical storage extent set to be provided by a physical disk drive in a storage apparatus, copying the contents of a logical volume set in a physical volume to a logical volume set in a backup physical volume when the load is determined to be high based on the measurement results, and providing to a host system a copied logical volume set in a backup physical volume and a logical volume set in a physical volume of a copy source as one virtual logical volume. Moreover, this method seeks to balance the load by accessing a logical volume with the smallest load among the virtual logical volumes during the reading of data from the host system (refer to Japanese Patent Laid-Open Publication No. 2006-053601).

According to this method, it is possible to provide a storage apparatus capable of performing dynamic load balancing or performance acceleration to a peak performance request that is unable to anticipate the time series variation of Web servers and contents distribution.

SUMMARY

Nevertheless, according to this method, although it seeks to balance the load by accessing a logical volume with the smallest load, no consideration is given to balance the load of the individual logical volumes by balancing the load of the logical volume itself and consequently performing the load balancing or performance acceleration of the overall logical volume.

The present was made in view of the foregoing points. Thus, an object of the present invention is to provide a storage apparatus and a storage apparatus control method capable of balancing the load of individual logical volumes by balancing the load against the logical volume itself in a storage apparatus and consequently performing the load balancing or performance acceleration of the overall logical volume.

In order to achieve the foregoing object, the present invention provides a storage apparatus comprising a storage unit for providing a backup volume configured from one or more volumes storing data from a higher-level device and one or more preliminary volumes, and a control unit for controlling the reading and writing of data from and in the volume in response to a read request and a write request from a higher-level device. The control unit measures the load status of the volume based on the data volume and command throughput transferred between the higher-level device and the storage unit, copies the contents of the volume having a load exceeding the default value to one or more backup volumes based on the measurement results of the load status of the volume, associates the volume of a copy source and the backup volume of a copy destination with one virtual volume, and provides the virtual volume to the higher-level device. When a write request involving read processing for reading data from the virtual volume is given from the higher-level device, the control unit reads the data from a default volume or the backup volume associated with the virtual volume and writes data from the higher-level device in all the volumes and backup volumes associated with the virtual volume, and, when a read request for reading data from the virtual volume is given, the control unit reads corresponding data from the volume or the backup volume other than the default volume or backup volume among the volume and the backup volume associated with the virtual volume.

Thereby, according to this storage apparatus, it is possible to separate the volume or backup volume from which corresponding data is to be read according to a read request from the higher-level device, and the volume or backup volume from which necessary data is to be read according to a write request involving the reading of data from the higher-level device. Thus, it is possible to seek the load balancing between the volumes and backup volumes associated with the same virtual volume.

The present invention also provides a control method of a storage apparatus which provides a backup volume configured from one or more volumes storing data from a higher-level device and one or more preliminary volumes, and controls the reading and writing of data from and in the volume in response to a read request and a write request from a higher-level device. This storage apparatus control method comprises the steps of measuring the load status of the volume based on the data volume and command throughput transferred between the higher-level device and the storage unit; copying the contents of the volume having a load exceeding the default value to one or more backup volumes based on the measurement results of the load status of the volume, associating the volume of a copy source and the backup volume of a copy destination with one virtual volume, and providing the virtual volume to the higher-level device; and when a write request involving read processing for reading data from the virtual volume is given from the higher-level device, reading the data from a default volume or the backup volume associated with the virtual volume and writing data from the higher-level device in all the volumes and backup volumes associated with the virtual volume, and, when a read request for reading data from the virtual volume is given, reading corresponding data from the volume or the backup volume other than the default volume or backup volume among the volume and the backup volume associated with the virtual volume.

Thereby, according to this storage apparatus control method, it is possible to separate the volume or backup volume from which corresponding data is to be read according to a read request from the higher-level device, and the volume or backup volume from which necessary data is to be read according to a write request involving the reading of data from the higher-level device. Thus, it is possible to seek the load balancing between the volumes and backup volumes associated with the same virtual volume.

According to the present invention, it is possible to balance the load of individual logical volumes by balancing the load against the logical volume itself in a storage apparatus and consequently performing the load balancing or performance acceleration of the overall logical volume.

DESCRIPTION OF DRAWINGS

FIG. 3 is a diagram showing the virtual logical unit LU/real logical unit LU mapping table 2 in the control table 11 of the storage apparatus according to an embodiment of the present invention;

FIG. 4 is a diagram showing the performance monitoring table 30 in the control table 11 of the storage apparatus according to an embodiment of the present invention;

DETAILED DESCRIPTION (1) First Embodiment

Figure 1:
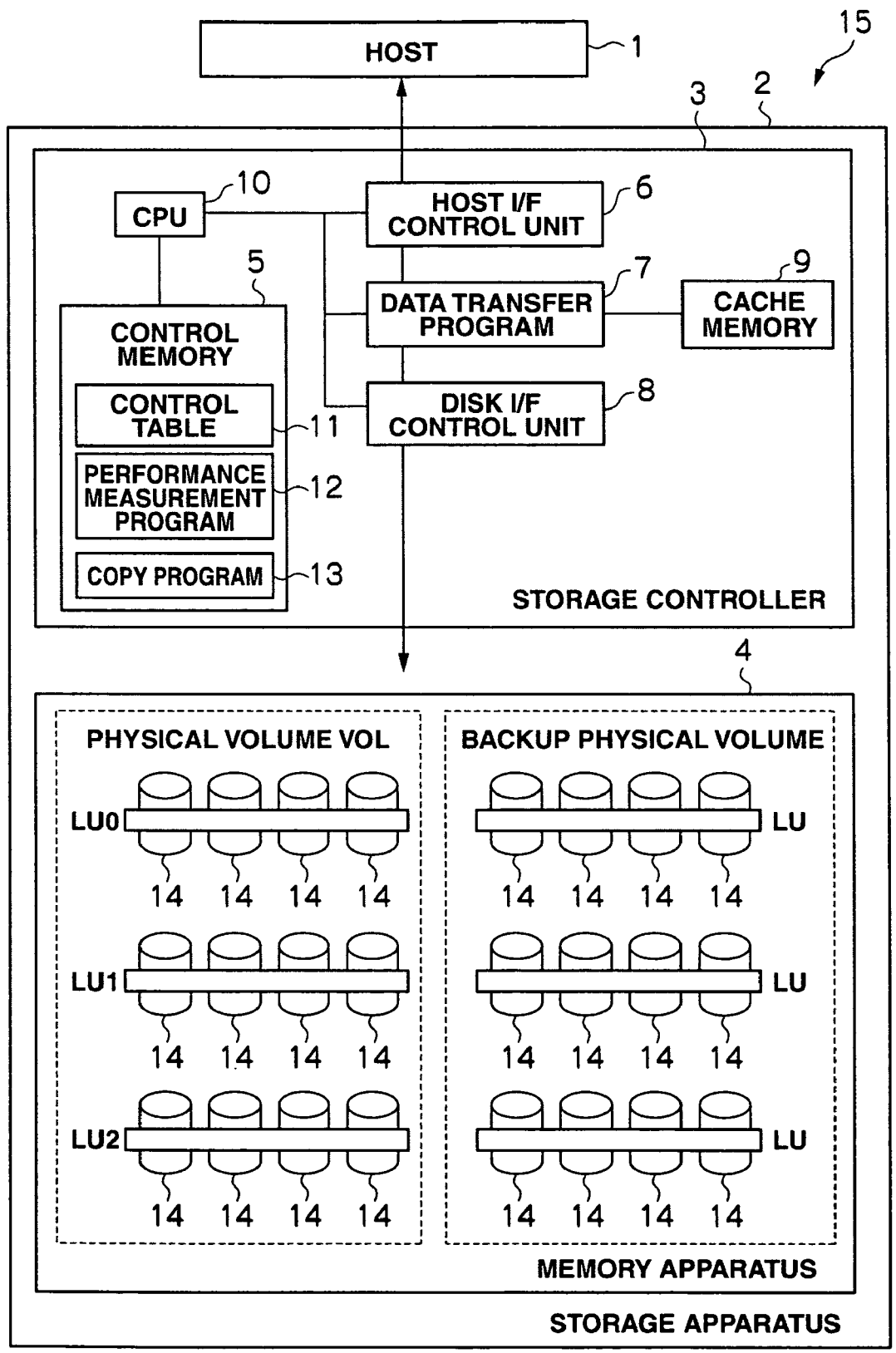
FIG. 1 is a configuration diagram showing the configuration of the storage apparatus 2 according to an embodiment of the present invention.

The first embodiment of the present invention is now explained in detail with reference to the attached drawings. Incidentally, as a general rule, the same reference numerals are given to the same components in all diagrams for explaining the first embodiment, and the repetitive explanation thereof is omitted.

(1-1) Configuration of Storage Apparatus in First Embodiment

FIG. 1 shows the overall storage system 15 according to the first embodiment. The storage system 15 is configured by a host system 1 and a storage apparatus 2 being directly connected, or indirectly connected via a network such as a SAN (Storage Area Network).

FIG. 1 shows the overall storage apparatus 2 according to the first embodiment. The storage apparatus 2 is configured by being connected to the host system 1 as a higher-level device.

The host system 1 as the higher-level device is a computer device comprising information processing resources such as a CPU (Central Processing Unit) not shown and a memory not shown, and, for example, is configured from a personal computer, workstation, mainframe or the like. The host system 1 comprises an information input device (not shown) such as a keyboard, a switch, a pointing device or a microphone, and an information output device (not shown) such as a monitor display or a speaker.

The storage apparatus 2, as shown in FIG. 1, comprises a memory apparatus 4 having a physical volume VOL configured from a plurality of physical disk drives 14 storing data and a backup physical volume VOL, and a storage controller 3 for controlling the input and output of data to and from the memory apparatus 4.

The physical disk drives 14, for instance, are configured from a data storage medium such as a hard disk drive. These physical disk drives 14 are operated by the storage controller 3 according to a RAID (Redundant Arrays of Inexpensive Disks) system.

One or more logical units (these are hereinafter referred to as "logical units") LU are set in a physical volume VOL, which is a physical storage extent, provided by one or more physical disk drives 14. Data from the host system 1 is stored in the logical units LU in block units of a prescribed size (this is hereinafter referred to as "logical block"). Thereby, it is possible to provide a large-capacity storage extent to the host system 1.

Each logical unit LU is assigned a unique volume number. In the case of this embodiment, the logical unit LU number and a unique number (LBA: Logical Block Address) allocated to each block are set as the address, and the input and output of data is conducted by designating such address.

Meanwhile, the storage controller 3 comprises a CPU 10, a control memory 5, a host I/F (Interface) control unit 6, a data transfer program 7, a disk I/F control unit 8 and a cache memory 9. The storage controller 3 is connected to the host system 1 and so on via a network or the like.

The CPU 10 is a processor that controls the host I/F control unit 6, the disk I/F control unit 8 and the data transfer program 7 based on information in a control memory 5 described later, and controls the various types of processing such as data I/O processing to and from the physical disk drive 14 in response to a write access request or a read access request from the host system 1.

The control memory 5 is used for retaining various control programs, and is also used as a work memory of the CPU 10. A control table 11, a performance measurement program 12, a copy program 13 and so on are also stored in the control memory 5.

The host I/F control unit 6 comprises a communication interface for performing communication between the storage apparatus 2 and the host system 1, and a function for giving and receiving a data I/O command to and from the host system 1.

The disk I/F control unit 8 is communicably connected to a plurality of physical disk drives 14 storing data, and controls the memory apparatus 4. The data transfer program 7 performs data transfer processing between the host system 1 and the memory apparatus 4. The cache memory 9 temporarily stores data to be sent and received between the host system 1 and the memory apparatus 4.

Figure 2:
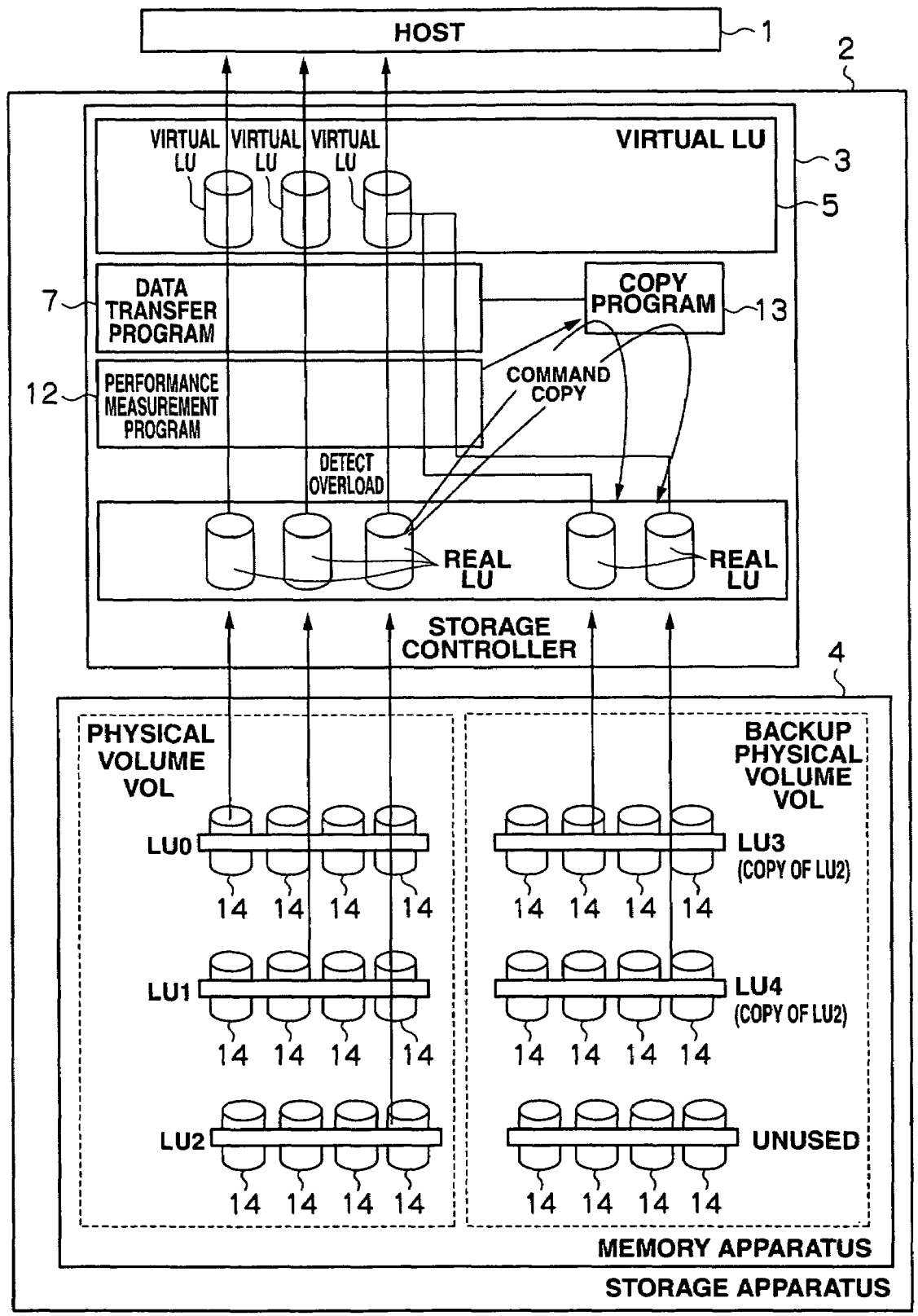
FIG. 2 is an explanatory diagram for explaining the load balancing processing of the storage apparatus 2 according to an embodiment of the present invention.

(1-2) Load Balancing Function of Storage Apparatus 2 in First Embodiment (1-2-1) Outline of Load Balancing Processing Function Outline of the [load] balancing processing function loaded in the storage apparatus 2 pertaining to this embodiment is now explained. FIG. 2 is an explanatory diagram explaining the load balancing processing function of the storage apparatus 2 according to the first embodiment of this invention.

In FIG. 2, the storage controller 3 has the function of managing the respective logical units LU configuring the physical volumes VOL and the backup physical volumes VOL in the memory apparatus 4 as real logical units LU, and providing to the host system 1 a plurality of logical units LU as a single virtualized logical unit (this is hereinafter referred to as "virtual logical unit", and a normal logical unit that has not been virtualized will be hereinafter be referred to as a "real logical unit" as need for the comparison thereof) LU.

In other words, the storage controller 3 is able to make the host system 1 recognize the logical units LU in the physical volume VOL, and the logical units in the backup physical volume VOL to which data stored in the foregoing logical units LU was copied with the copy program 13 stored in the control memory 5 described later (logical units LU created by copying as described above are hereinafter referred to as "mirrored logical units LU") as a single virtual logical unit LU.

Thereby, without having to perform access processing of data to the logical units LU provided as a virtual logical unit LU, the host system 1 will be able to access the mirrored logical units LU multiplexed by the copy program 13 without having to recognize the configuration of the real logical units LU in the storage controller 3.

When each of the logical units LU in the physical volume VOL is of a normal accessible state, the storage controller 3 provides the real logical units LU of the respective logical units LU as virtual logical units LU to the host system 1 without change.

The performance measurement program 12 measures the data volume being processed by the data transfer program with respect to each logical unit LU, and measures the processing capacity to the respective logical units LU.

The storage controller 3 makes the user of the storage apparatus 2 set a threshold value for starting the copy creation when creating a mirrored logical unit LU, which is a copy of the logical unit LU that is the same as the logical unit LU in the physical volume VOL, in the backup physical volume VOL. As the threshold value to be set, for instance, the load factor (%) in relation to the marginal performance of the logical unit LU may be used.

When the load against a logical unit LU increases and exceeds the foregoing threshold value, a mirrored logical unit LU is automatically created as a copy of the logical unit LU. The mirrored logical unit LU created in the backup physical volume VOL as a copy of the logical unit LU in the physical volume VOL may be multiplexed not only as double, but also as triple and quadruple depending on the load status of the logical unit LU.

In addition to the storage controller 3 automatically creating the mirrored logical unit LU of the logical unit LU in the physical volume VOL, the user may also issue a copy start command based on information from the storage apparatus 2. Specifically, the user may estimate the increase of performance in the future from history information of the performance load up to such time, anticipate the copy time, and issue a command for starting the copy in advance. In an operational mode where the high load time occurs periodically, the user may also activate a timer and periodically issue a copy start command at the start of such high load time.

Incidentally, when trying to create a mirrored logical unit LU, if there is no space to create a new mirrored logical unit LU since another logical unit LU is already using a mirrored logical unit LU, the logical unit with the lowest load or a logical unit LU having a low mirror creation priority is released, and the resulting unused mirror extent is used.

The mirrored logical unit LU created by copying the logical unit LU in the backup physical volume VOL and the logical unit LU in the physical volume VOL are recognized as virtual logical units LU by the host system 1 as being the same logical unit LU.

Thereby, when the host system 1 is to access data from the virtual logical unit LU, such access can be distributed to the real logical unit LU in the physical volume VOL and to one or more real logical units LU in the backup physical volume VOL. Thus, if the processing capacity of the logical unit LU in the physical volume VOL reaches its limit due to the access from the host system 1, it is possible to extend the capability of such logical unit LU. Further, the host system 1 will be able to perform data access processing as with a normal logical unit LU without having to recognize the copy processing of the logical unit LU.

When the load against the logical unit LU is alleviated and exceeds the threshold value of releasing the mirror set by the user in advance, the storage controller 3 releases the mirrored logical unit LU and ends the load balancing processing. Incidentally, although the mirrored logical unit LU may be automatically released when the load against the logical unit LU becomes a low load, the user may also issue a release command based on information from the storage apparatus 2. In an operational mode where the high load time occurs periodically, the user may also activate a timer and release the mirrored logical unit LU at the end of such high load time.

In the example shown in FIG. 2, the data volume to the logical unit LU2 in the physical volume VOL is exceeding the threshold value set based on the marginal performance value of the logical unit LU2. Here, the performance measurement program 12 outputs a command to the copy program 13 for copying data of the real logical unit LU2 in the physical volume VOL to the real logical unit LU in the backup physical volume VOL, and creating a copy of the logical unit LU2 in the logical unit LU3 and logical unit LU4, which are logical units LU in the backup physical volume VOL.

Thereby, the logical unit LU2 in the physical volume VOL, and the mirrored logical units LU; that is, the logical unit LU3 and logical unit LU4 created by being newly copied in the backup physical volume VOL are recognized as virtual logical units LU by the host system 1 as the same logical unit as the logical unit LU2 in the physical volume VOL.

When the host system 1 is to access data from the virtual logical unit LU, such access can be distributed to the logical unit LU2 in the physical volume VOL and to the logical unit LU3 and logical unit LU4 in the backup physical volume VOL. Thus, if the processing capacity of the logical unit LU2 reaches its limit due to the access from the host system 1, it is possible to extend the capability of such logical unit LU2. Further, the host system 1 will be able to perform data access processing as with normal processing without having to recognize the copy processing of the logical unit LU in the real logical unit LU.

The load balancing processing upon performing read and write processing to the mirrored logical unit LU created as described above is now explained.

Foremost, operation of write processing to the logical unit LU of the storage apparatus 2 is explained. In the write processing to the logical unit LU according to the first embodiment, one of two processing routines is employed; namely, a method of updating data of all logical units by accessing all logical units in the physical volume VOL and all logical units LU in the backup physical volume VOL to which the logical units LU in the physical volume VOL are copied for the write host access, or a method of accessing the original logical unit LU in the physical volume VOL and updating data of only the original logical unit LU, storing the logical unit LU update management information (logical unit LU update management bitmap) indicating the update in the control table 11, and using the logical unit LU update management information to access the original logical unit LU in the physical volume VOL regarding the updated data during reading for the write host access.

Foremost, when accessing all logical units LU in the physical volume VOL and all logical units LU in the backup physical volume VOL to which the logical units LU in the physical volume VOL are copied, the virtual logical unit LU/real logical unit LU mapping table 20 is referred to, and whether two or more logical units LU are mapped to the virtual logical unit LU2 corresponding to the host access is determined.

When two or more logical units LU are not mapped to the virtual logical unit LU corresponding to the host access, logical units LU of the mapping destination are accessed. Meanwhile, when two or more logical units LU are mapped to the virtual logical unit LU corresponding to the host access, logical units LU of all mapping destinations are accessed.

Operation of read processing to the logical unit LU of the storage apparatus 2 is now explained. As the read processing to the logical unit LU of the storage apparatus 2, foremost, as with the write processing, the virtual logical unit LU/real logical unit LU mapping table 20 in the control table 11 is referred to, and whether two or more logical units LU are mapped to the virtual logical unit LU2 corresponding to the host access is determined.

When two or more logical units LU are not mapped to the virtual logical unit LU, logical units LU of the mapping destination are accessed. Meanwhile, when two or more logical units LU are mapped to the virtual logical unit LU, information of the performance monitoring table 30 in the control table 11 corresponding to the mapping destination logical unit LU is referred to, and logical units LU of the mapping destination with the smallest load are accessed. As the load balancing method, there is also a method of extracting the transfer performance limit of the drives by determining the sequentiality and retaining the sequentiality of access to the respective physical volumes VOL, and a load balancing algorithm suitable for the application is used.

As described above, as a result of performing write processing and read processing, the host system 1 will access the mapping destination logical unit LU with the smallest load, and it will be possible to balance the load of the logical units LU.

With the read processing, in addition to selecting and accessing the logical unit LU with the lowest load, it is also possible to balance the load by selecting and accessing a logical unit LU that is separate from the logical unit LU previously subject to read processing.

In other words, if the logical unit LU previously subject to read processing and the logical unit LU to be subsequently subject to read processing are different logical units LU, the roles will be shared by each logical unit LU.

If each logical unit LU plays a different role, the load will not be concentrated on one specified logical unit LU. Since the roles that were conventionally performed by one logical unit LU will be shared by a plurality of logical units LU, the load on individual logical units LU will decrease, and the response speed of individual logical units LU will increase.

Incidentally, when performing this kind of read processing, it is not necessary to always measure the load status of the individual logical units LU in advance. Thus, it is possible to perform the data read processing more efficiently and faster without measuring the load status and giving consideration to the measurement results.

Among the write processing and read processing described above, the write processing and read processing when performing read/modify/write processing are now explained.

The read/modify/write processing is a series of processing steps where the storage apparatus 3 which received a command for performing write processing from the host system uniquely reads the contents of the memory/cell or register prior to the write processing, modifies (or processes) data and thereafter writes such data. For instance, this is employed for changing the contents of a specified bit of a mode setting register and performing resetting processing in order to change the operation mode of a device.

The reading and writing of such data are conducted in byte or word units. When the access request from the host system 1 is a request required for bit processing or logical operation, among the data read in byte or word units, data of non-designated bits is written as is without being subject to any modification or processing.

As a specific example of read/modify/write processing, for instance, there is processing of storing data in a certain specified location read in byte units, processing the designated bit as necessary among the read data, leaving the data of non-designated bits as is without processing, and writing data in the originally designated location.

Foremost, the following read/modify/write processing is performed when accessing all logical units LU in the physical volume VOL and all logical units LU in the backup physical volume VOL to which the logical units LU in the physical volume VOL are copied, and two or more logical units LU are mapped to the virtual logical unit LU corresponding to the host access as a result of referring to the virtual logical unit LU/real logical unit LU mapping table 20 in the foregoing write processing.

Foremost, the storage apparatus 3 which received a command from the host system for performing write processing performs read/modify processing of the read/modify/write processing to only one logical unit LU among the plurality of logical units LU of the logical units LU set in the physical volume VOL and the logical units set in the backup physical volume VOL. Thereafter, the write processing is executed to all logical units LU of the mapping destination logical unit LU.

The logical unit LU to be subject to the read/modify processing may be a logical unit LU set in the physical volume VOL or a logical unit LU set in the backup physical volume VOL.

Like this, if read/modify processing of the read/modify/write processing is performed only to one logical unit LU, and write processing of the mapping destination logical unit LU is thereafter executed to all corresponding logical units LU, it is not necessary to perform the read/modify processing to all logical units LU.

Thus, excluding the one logical unit LU subject to the read/modify processing, compared to a case of performing all processing of read/modify/write to all logical units LU or a plurality of logical units LU, the access load to the overall logical unit LU will be alleviated, and the balancing of the load is thereby realized.

Operation of the data read processing from the host system 2 to the logical unit LU after performing the read/modify/write processing is now explained. Data is read from a logical unit LU in which the read/modify processing has not been performed and only the write processing has been performed among logical units LU that have been completely subject to the read/modify/write processing for the read host access.

Thereby, in the read/modify/write processing and the subsequent data read processing, the logical unit LU to perform the read/modify processing and the logical unit LU to perform the data read processing will be different logical units LU, and roles will be shared by each logical unit LU.

If each logical unit LU plays a different role, the load will not be concentrated on one specified logical unit LU. Since the roles that were conventionally performed by one logical unit LU will be shared by a plurality of logical units LU, the load on individual logical units LU will decrease, and the response speed of individual logical units LU will increase. In particular, when performing complex processing such as the read/modify/write processing, if the roles are shared by the logical units LU, the load balancing of the overall logical unit LU can be realized efficiently.

Incidentally, when performing this kind of read/modify/write processing or the subsequent data read processing, it is not necessary to always measure the load status of the individual logical units LU in advance. Thus, when performing complex processing such as read/modify/write processing, it is possible to perform the data read processing more efficiently and faster without measuring the load status and giving consideration to the measurement results.

Nevertheless, this does not inhibit the processing of measuring the load as needed and selecting a logical unit LU with the lowest load as the logical unit LU for performing the read/modify/write processing and a logical unit LU for performing read/modify/write processing, and reading data from a logical unit LU with the lowest load among the logical units LU that are different from the logical unit that performed the read/modify/write processing in the subsequent data read processing.

(1-2-2) Configuration of Respective Tables and Programs

As a means for executing this kind of load balancing processing function, the storage controller 3 retains a control table 11, a performance measurement program 12 and a copy program 13 in the control memory 5 as shown in FIG. 1 and FIG. 2.

Foremost, the contents of the control table 11 are explained with reference to FIG. 3 to FIG. 5. The control table 11 is configured from a virtual logical unit LU/real logical unit LU mapping table 20, a performance monitoring table 30 and a backup physical volume management table 40.

The virtual LU/real LU mapping table 20 is a table showing the correspondence of the virtual logical unit LU and the real logical unit LU. As a result of using the virtual logical unit LU/real logical unit LU mapping table 20, it is possible to manage the virtual logical unit LU, and provide a virtual logical unit LU to the host system 1 without having to make it recognize the real logical unit LU.

The virtual LU/real LU mapping table 20, as shown in FIG. 3, is configured from a "virtual LU number" field 21, a "number of mapped LUs" field 22 and a "real LU number" field 23.

The "virtual LU number" field 21 stores the logical unit LU numbers of the logical units LU set in the virtual logical unit LU. The "number of mapped LUs" field 22 stores number of real logical units LU subject to conversion (hereinafter referred to as "mapping") between the two data address spaces; namely, the block address of a certain virtual logical unit LU and the block address of a real logical unit LU. The "real LU number" field 23 stores the logical unit LU numbers of the real logical unit LU mapped to the virtual logical unit LU.

Accordingly, in the example shown in FIG. 3, for instance, only one real logical unit LU having a logical unit LU number of "LU0" is mapped to a virtual logical unit LU having a logical unit LU number of "LU0". Further, three real logical units LU having logical unit LU numbers of "LU2", "LU3" and "LU4" are mapped to a virtual logical unit LU having a logical unit number of "LU2".

The performance monitoring table 30 is a table showing the load status of the real logical unit LU. As a result of using the performance monitoring table 30, it is possible to refer to the threshold value set in advance based on the marginal performance value of the logical unit LU, and determine whether the real logical unit LU is overloaded.

The performance monitoring table 30, as shown in FIG. 4, is configured from a "real LU number" field 31, a "number of processing commands per unit time" field 32 and a "throughput per unit time" field 33.

The "real LU number" field 31 stores the logical unit LU number of the real logical unit LU in which the performance thereof is to be monitored. The "number of processing commands per unit time" field 32 stores information of the number of processing commands (transactions) per unit time (1 second for instance) issued to the real logical unit LU having the logical unit LU number of the real logical unit stored in the "real LU number" field 31. The "throughput per unit time" field 33 stores information of the data processing volume (throughput) per unit time (1 second for instance) to the real logical unit LU having the logical unit LU number of the real logical unit stored in the "real LU number" field 31.

Accordingly, the example in FIG. 4 shows the number of processing commands and the throughput per unit time to the logical units LU having a logical unit LU number from "LU0" to "LUn". For example, the number of processing commands per unit time [to the logical unit LU] having a logical unit LU number of "LU0" is "$a_0$", and the throughput per unit time is "$b_0$". Moreover, the number of processing commands per unit time to the logical unit LU having a logical unit LU number of an arbitrary "LUn" is "$a_n$", and the throughput per unit time is "$b_n$".

The backup physical volume VOL management table 40 is a table showing the real logical unit LU currently using the backup extent in the backup physical volume VOL. The backup physical volume VOL management table 40, as shown in FIG. 5, is configured from a "backup extent in-use real LU number" field 41 and a "copy source real LU number" field 42.

The "backup extent in-use real LU number" field 41 stores the logical unit LU number of the real logical unit LU created in the backup physical volume VOL. Meanwhile, the "copy source real LU number" field 42 stores the logical unit LU number of the real logical unit LU in the physical volume VOL that became a copy source of the real logical unit LU.

Figures 5, 6:
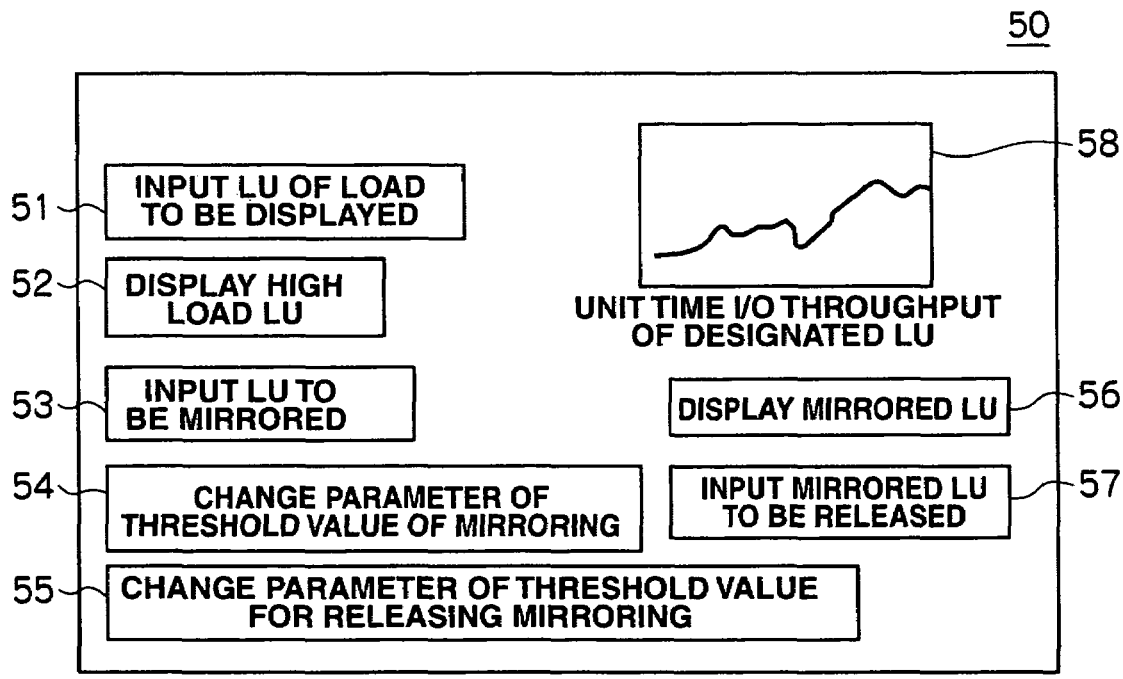
FIG. 5 is a diagram showing the backup physical volume VOL management table 40 in the control table 11 of the storage apparatus according to an embodiment of the present invention.
FIG. 6 is a plan view explaining the user interface operation screen 50.

Accordingly, the example in FIG. 5 shows that the copy source of the logical unit LU having a logical unit LU number of "LU3" and currently using the backup physical volume VOL extent is the logical unit LU having a logical unit LU number of "LU2".

Subsequently, the performance measurement program 12 measures the processing capacity of the logical unit LU set in the physical volume VOL of the memory apparatus 4 with a counter or the like for measuring the data transfer volume (throughput) or number of processing commands (transaction) using the data transfer program 7, and determines whether to create a copy of the logical unit LU set in the physical volume; that is, whether to create a mirrored logical unit LU in the backup physical volume VOL based on the threshold value set based on the marginal performance value of the logical unit LU.

As the counter to be used in the performance measurement program 12, hardware provided to the data transfer program 7 or a software counter may be used to measure the data volume being processed in the data transfer program 7.

The copy program 13 creates a copy of the logical unit LU in the physical volume VOL; that is, creates a mirrored logical unit LU in the backup physical volume VOL based on the determination of the performance measurement program 12.

Incidentally, the performance measurement program 12 and the copy program 13, in addition to being stored in the control memory 5, may also be stored in the memory apparatus 4 so as to execute the functions thereof.

(1-2-3) Display of Various Types of Information in Display Unit and Management Terminal of Storage Controller 3, and Operation with User Interface Operation Screen of User Terminal 60

The storage apparatus 2 is configured so that it is able to display various types of information on the display unit or management termination in the storage controller 3 for the user to see.

The following types of information are displayed for each logical unit LU on the display unit or management terminal of the storage controller 3.

Marginal performance value (throughput/transaction)
  Temporal change (history) of load factor in relation to load status (throughput/transaction) and marginal performance
  Status of mirrored logical unit LU and number of mirrored logical units LU in use
  Load status to mirrored logical units LU Based on these displayed contents, the user is able to confirm the marginal performance of the respective logical units LU, and the load status to the respective logical units LU.

As the contents to be input as parameters, for instance, items of setting parameters shown below may be displayed for each logical unit LU so as to accept the input of parameters by the user.

Selection of Enable/Disable of mirror inside logical unit LU of first embodiment
  Mode switching of automatic mirrored logical unit LU creation/manual mirrored logical unit LU creation/fixed mirrored logical unit LU creation
  Upper limit of created mirrored logical unit LU
  Performance threshold value (percentage against marginal performance of logical unit LU) for starting the creation of an internal mirrored logical unit LU and releasing a mirrored logical unit LU
  Priority for creating mirrored logical units LU By inputting these parameters, it is possible to set the mirror creation operation in the respective logical units LU.

Figure 14:
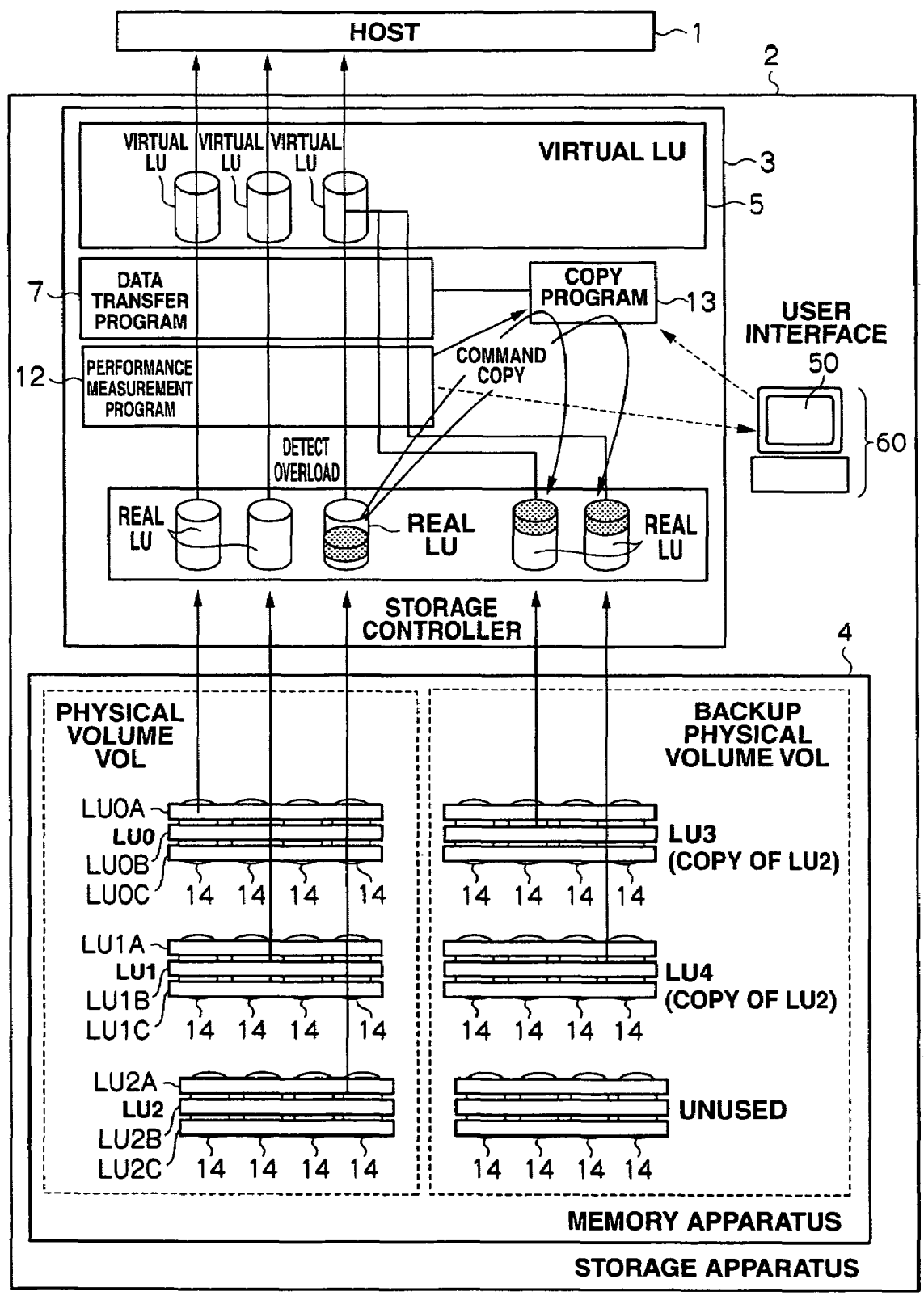
FIG. 14 is an explanatory diagram explaining the load balancing processing of the storage apparatus according to another embodiment of the present invention.

In the first embodiment, as also shown in FIG. 14, the user terminal 60 is connected to the storage controller 3, and is able to detect the overload of the logical unit LU based on information measured with the performance measurement program 12.

In addition, by the user issuing a command to activate copying to the copy program 13 based on the detected results, it is possible to perform the copy processing from the logical unit LU of the physical volume VOL to the logical unit LU of the backup physical volume VOL. In other words, the user is able to use the user interface operation screen 50 of the user terminal 60 to detect the overload of the logical unit LU, and then issue a command for activating the copy.

In the user interface of the user terminal, the operation screen 50 is a GUI (Graphical User Interface) screen used for making various settings or changing such settings relating to the foregoing load balancing processing. As shown in FIG. 6, the operation screen 50 is configured from a load logical unit LU display unit 51, a high load logical unit LU display unit 52, a mirrored logical unit LU display unit 53, a mirrored load threshold value parameter modification unit 54, a mirror release load threshold value parameter display unit 55, a mirrored logical unit LU display unit 56, a mirror release logical unit LU display unit 57, and a logical unit LU I/O throughput display unit 58.

Contents of the respective units are now explained. Foremost, the load logical unit LU display unit 51 is used to input the logical unit LU number of the logical unit LU which the user selected as the operation target in the operation screen and wishes to display the load status thereof. For instance, when the user wishes to display the load of a logical unit LU having a logical unit LU number of "LU0", the user inputs logical unit LU number "LU0". Incidentally, the load logical unit LU display unit 51 may also be configured in the form of a dialog box so that a desired logical unit LU can be selected.

When the user clicks the high load logical unit LU display unit 52, it displays the logical unit LU number of a logical unit LU currently with a high load.

The mirrored logical unit LU display unit 53 is used to input the logical unit LU number of a logical unit LU scheduled to subsequently create a mirrored logical unit LU. Incidentally, the mirrored logical unit LU display unit 53 may also be configured in the form of a dialog box so that a desired logical unit LU can be selected.

The mirror creation load threshold value parameter modification unit 54 is used by a user to input a modified value when modifying the parameter used in creating the mirrored logical unit LU such as the number of processing commands per unit time or the throughput per unit time of the logical unit LU.

The mirror release load threshold value parameter display unit 55 is used by a user to input a modified value when modifying the parameter used in releasing the mirrored logical unit LU such as the number of processing commands per unit time or the throughput per unit time of the logical unit LU.

By clicking the mirrored logical unit LU display unit 56, it displays the logical unit LU number of the mirrored logical unit LU currently being created.

The mirror release logical unit LU display unit 57 is used to input the logical unit LU number of the logical unit LU in which the user wishes to release the mirror among the mirrored logical units LU display in the mirrored logical unit LU display unit 56.

The logical unit LU I/O throughput display unit 58 is used for displaying the data I/O throughput per unit time of the designated logical unit LU.

(1-24) Operation of Mirrored Logical Unit LU Creation

Figure 7:
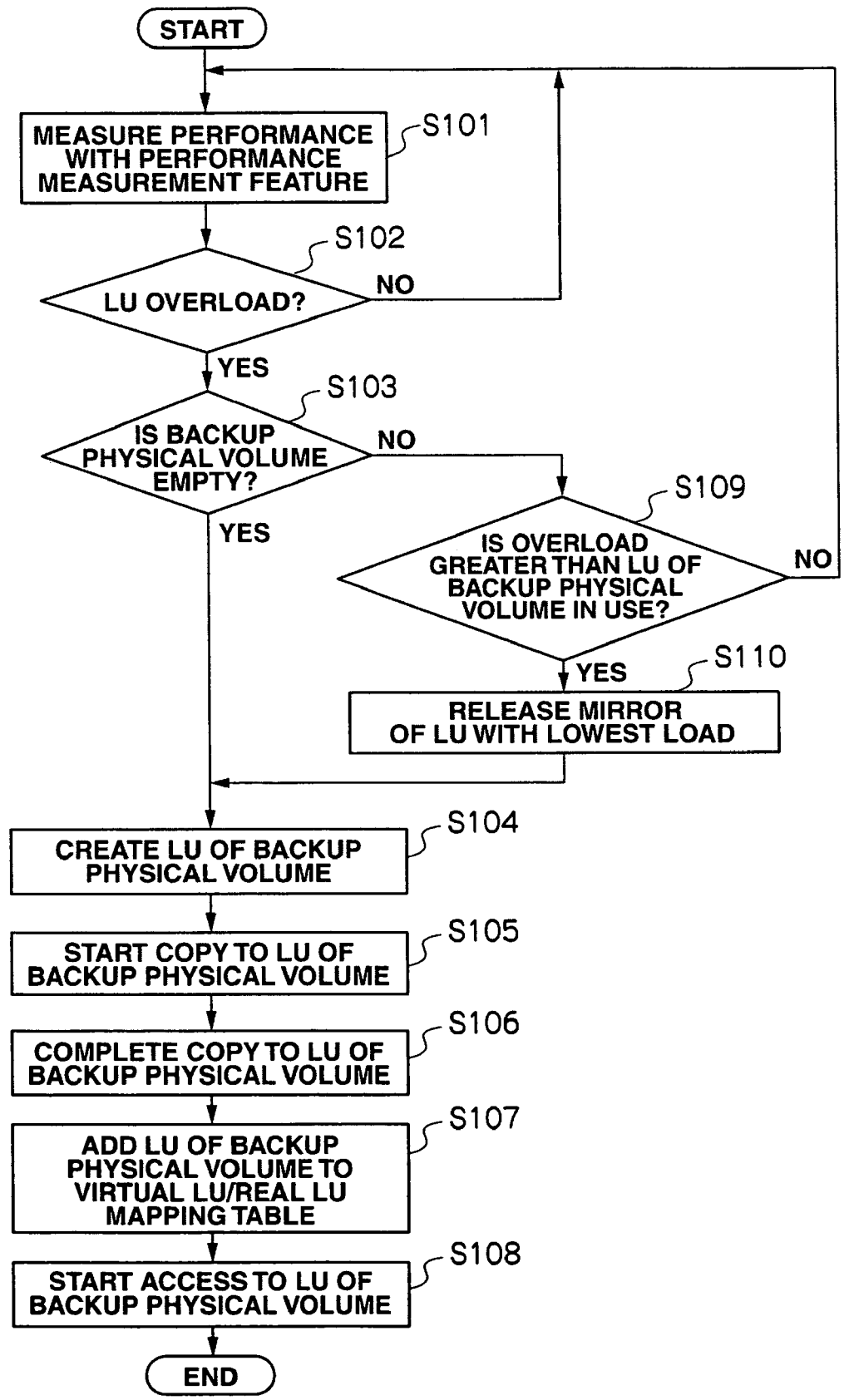
FIG. 7 is a flowchart showing an example of the operation for creating a copy logical unit LU of the storage apparatus 2 according to an embodiment of the present invention.

Operation of the mirrored logical unit LU creation by the storage apparatus 2 pertaining to the first embodiment of the present invention is now explained. FIG. 7 is a flowchart showing an example of the operation for creating a mirrored logical unit LU by the storage apparatus 2 according to the first embodiment of this invention.

Foremost, when there is no empty backup physical volume VOL upon creating a mirrored logical unit LU in the backup physical volume VOL, the CPU 10 of the storage controller 3 performs host access processing to the host system 1 and performs performance measurement to the logical unit LU based on the host access processing using the performance measurement program 12 as the operation including an operation for releasing the mirror of the logical unit LU in the backup physical volume VOL due to the overload status of the logical unit LU in the backup physical volume VOL (S101).

The CPU 10 determines whether the logical unit LU is overloaded based on the threshold value for starting the mirrored logical unit LU creation set in advance based on the result of the performance measurement at step S101 (S102). When the CPU 10 determines at step S102 that the logical unit LU is not overloaded (S102: NO), it returns to step S100. Meanwhile, when the CPU 10 determines at step S102 that the logical unit LU is overloaded (S102: YES), it determines whether there is an empty logical unit LU in the backup physical volume VOL (S103).

When the CPU 10 determines at step S103 that there is an empty logical unit LU in the backup physical volume VOL (S103: YES), it creates a logical unit LU to which data is to be copied from the logical unit LU of the physical volume VOL in the backup physical volume VOL (S104), and starts copying data to the logical unit LU in the backup physical volume VOL created at step S104 based on the copy program 13 (S105).

Subsequently, when the CPU 10 completes copying [data] to the logical unit LU in the backup physical volume VOL created at step S104 (S106), it adds the logical unit LU in the backup physical volume VOL to the virtual logical unit LU/real logical unit LU mapping table 20 in the control table 11 (S107), starts accessing the logical unit LU in the backup physical volume VOL (S108), makes the mirror status with the logical unit LU in the physical volume VOL; that is, makes two or more same copies of data to be maintained by separate media, and then ends this processing.

When the CPU 10 determines at step S103 that there is no empty logical unit LU in the backup physical volume VOL (S103: NO), it determines whether the overloaded logical unit LU is more overloaded than the logical unit LU that is already being used in the backup physical volume VOL (S109). When the CPU 10 determines at step S109 that the overloaded logical unit LU is not as overloaded as the logical unit LU that is already being used in the backup physical volume VOL (S109: NO), it returns to step S100. Meanwhile, when the CPU 10 determines at step S109 that the overloaded logical unit LU is more overloaded than the logical unit LU that is already being used in the backup physical volume VOL step S109 (S109: NO), it releases the mirror of the logical unit LU with the lowest load in the backup physical volume VOL based on the measurement results of the performance measurement program 12, creates an empty of the logical unit LU in the backup physical volume VOL (S110), and executes processing from step S104 onward.

As a result of the foregoing processing, a logical unit LU of the backup physical volume VOL is created when the logical unit LU is overloaded based on the measurement results of the performance measurement program 12, and the contents of the logical unit LU of the physical volume VOL are copied and become a mirrored status. The mirrored logical unit LU created as described above and the logical unit LU of the copy source are provided to the host system 1 as virtual logical units LU.

Thereby, even when the real logical unit LU configuring the virtual logical unit LU is overloaded as a result of the host system 1 accessing the logical unit LU provided as a virtual logical unit LU, it is possible to access the logical unit LU in a state where the load of the real logical unit LU is balanced.

(1-2-5) Operation of Write Processing for Writing Data in Logical Unit LU

Figure 8:
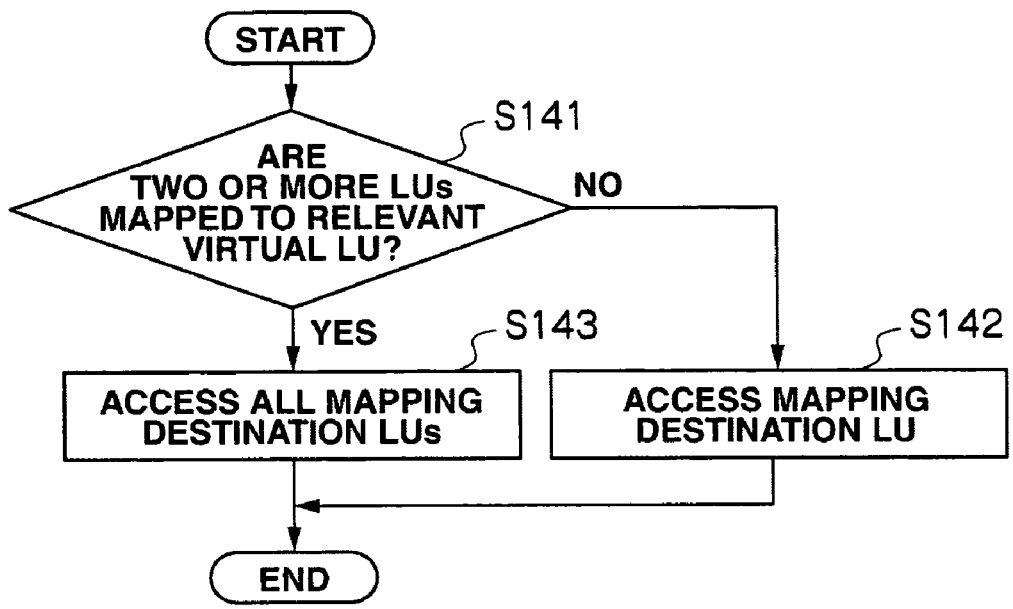
FIG. 8 is a flowchart showing an example of the operation of write processing for writing data in the logical unit LU of the storage apparatus 2 according to an embodiment of the present invention.

Operation of the write processing to the logical unit LU of the storage apparatus 2 pertaining to the first embodiment of the present invention is now explained with reference to FIG. 8. FIG. 8 is a flowchart showing an example of the operation for accessing all logical units and updating data of all logical units LU in the write processing to the logical unit LU of the storage apparatus 2 according to the first embodiment of this invention.

Foremost, when the CPU 10 receives a write host access from the host system 1 for writing data in the logical unit LU, it refers to the virtual logical unit LU/real logical unit LU mapping table 20 in the control table 11, and determines whether two or more logical units LU are mapped to the virtual logical unit LU corresponding to the host access (S141).

When the CPU 10 determines at step S141 that two or more logical units LU are not mapped to the virtual logical unit LU corresponding to the host access (S141: NO), it accesses the logical unit LU of the mapping destination (S142).

Meanwhile, when the CPU 10 determines that at S141 that two or more logical units LU are mapped to the virtual logical unit LU corresponding to the host access (S141: YES), it access all mapping destination logical units LU (S143), writes the data, and then ends this write processing.

(1-2-6) Operation of Read Processing for Reading Data from Logical Unit LU

Figure 9:
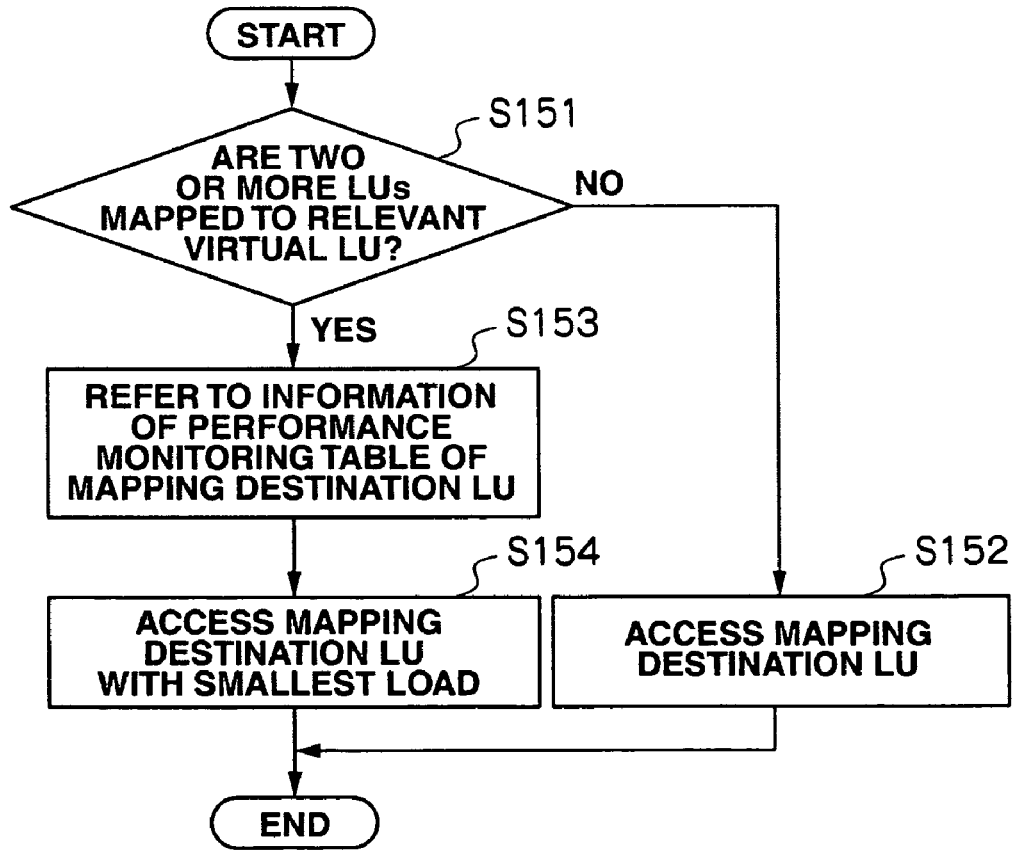
FIG. 9 is a flowchart showing and example of the operation of read processing for reading data from the logical unit LU of the storage apparatus 2 according to an embodiment of the present invention.

A case of selecting and accessing a logical unit LU with a low load among the operation of read processing to the logical unit LU of the storage apparatus 2 pertaining to the first embodiment of the present invention is now explained with reference to FIG. 9. FIG. 9 is a flowchart showing the operation of read processing to the logical unit LU of the storage apparatus 2 according to the first embodiment of this invention.

Foremost, when the CPU 10 receives a read host access from the host system 1 for reading data from the logical unit LU, it refers to the virtual logical unit LU/real logical unit LU mapping table 20 in the control table 11, and determines whether two or more logical units LU are mapped to the virtual logical unit LU corresponding to the host access (S151).

When the CPU 10 determines at S151 that two or more logical units LU are not mapped to the virtual logical unit LU corresponding to the host access (S151: NO); in other words, when only the logical units LU in the physical volume VOL are mapped, it accesses the logical unit LU of the mapping destination (S152).

Meanwhile, when the CPU 10 determines at S151 that two or more logical units LU are mapped to the virtual logical unit LU corresponding to the host access (S151: YES); in other words, when the logical units LU in the physical volume VOL are copied to the logical units LU in the backup physical volume VOL and in a mirrored status, it refers to the information of the performance monitoring table 30 in the control table 11 corresponding to the mapping destination logical unit LU (S153), accesses the mapping destination logical unit LU with the smallest load (S154), reads the data, and then ends this read processing.

As a result of the foregoing mirrored logical unit LU creation processing, when two or more logical units LU are mapped to the virtual logical unit LU, the host access from the host system 1 is accessed by the mapping destination logical unit LU with the smallest load, and it is possible to balance the load against the logical unit LU.

Figure 10:
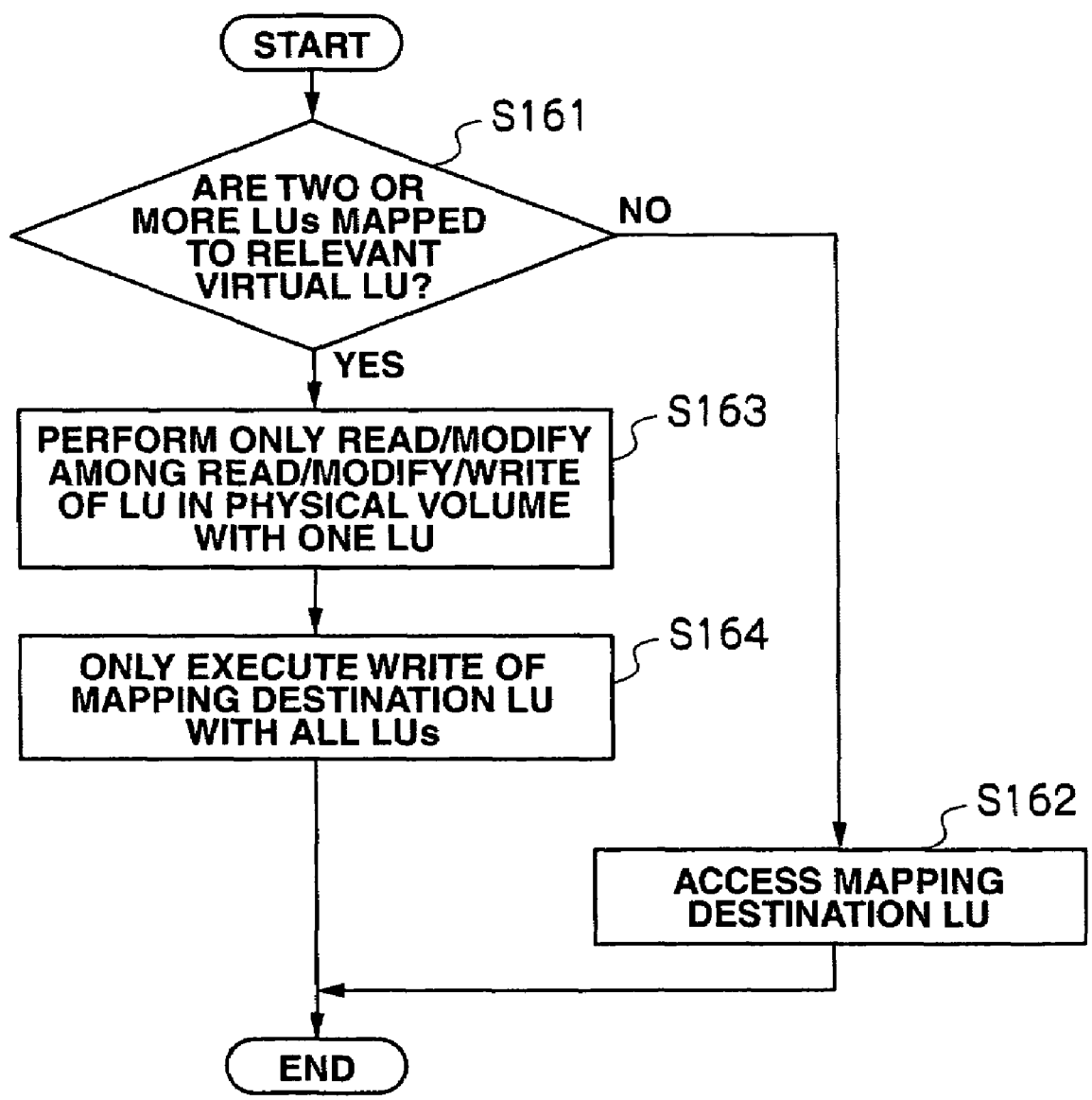
FIG. 10 is a flowchart showing an example of the operation of read/modify/write processing to be performed to the logical unit LU of the storage apparatus 2 according to an embodiment of the present invention.

(1-2-7) Operation of Write Processing for Writing Data in Logical Unit LU when Performing Read/Modify/Write Processing The write processing operation in the case of performing read/modify/write processing to the logical unit LU of the storage apparatus 2 pertaining to the first embodiment of the present invention is now explained with reference to FIG. 10. FIG. 10 is a flowchart showing an example of the operation of write processing in a case of performing read/modify/write processing to the logical unit LU of the storage apparatus 2 according to the first embodiment of this invention.

When the CPU 10 receives a write host access from the host system 1 for writing data in the logical unit LU, it refers to the virtual logical unit LU/real logical unit LU mapping table 20 in the control table 11, and determines whether two or more logical units LU are mapped to the virtual logical unit LU corresponding to the host access (S161).

When the CPU 10 determines at S161 that two or more logical units LU are not mapped to the virtual logical unit LU corresponding to the host access (S161: NO), it accesses the logical unit LU of the mapping destination (S162).

Meanwhile, when the CPU 10 determines at S161 that two or more logical units LU are mapped to the virtual logical unit LU corresponding to the host access (S161: YES), it performs read/modify processing of the read/modify/write processing to one logical unit LU among a plurality of logical units LU (S163). Thereafter, the CPU 10 writes data in all mapping destination logical units LU (S164), and then ends this write processing.

Figure 11:
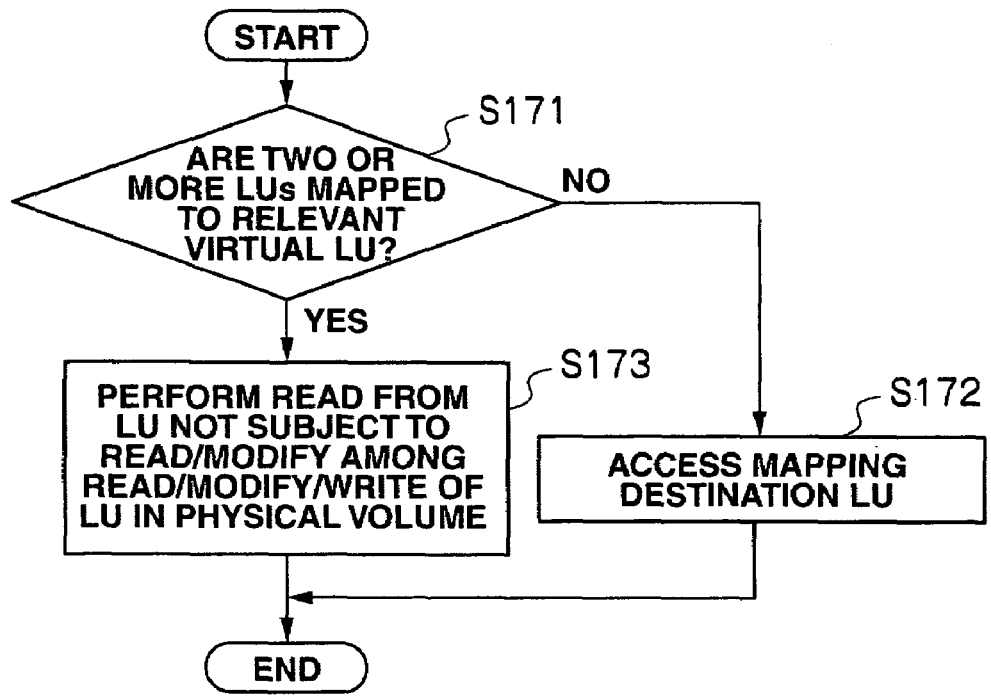
FIG. 11 is a flowchart showing an example of the read operation of the read/modify/write processing to be performed to the logical unit LU of the storage apparatus 2 according to an embodiment of the present invention.

(1-2-8) Operation of Read Processing for Reading Data from Logical Unit LU when Performing Read/Modify/Write Processing The read processing operation in the case of performing read/modify/write processing to the logical unit LU of the storage apparatus 2 pertaining to the first embodiment of the present invention is now explained with reference to FIG. 11. FIG. 11 is a flowchart showing an example of the operation of read processing in a case of performing read/modify/write processing to the logical unit LU of the storage apparatus 2 according to the first embodiment of this invention.

When the CPU 10 receives a read host access from the host system 1 for reading data from the logical unit LU, it refers to the virtual logical unit LU/real logical unit LU mapping table 20 in the control table 11, and determines whether two or more logical units LU are mapped to the virtual logical unit LU corresponding to the host access (S171).

When the CPU 10 determines at S171 that two or more logical units LU are not mapped to the virtual logical unit LU corresponding to the host access (S171: NO), it accesses the logical unit LU of the mapping destination (S172).

Meanwhile, when the CPU 10 determines at S171 that two or more logical units LU are mapped to the virtual logical unit LU corresponding to the host access (S171: YES), it performs data read processing from the logical unit LU subject only to write processing and not subject to read/modify processing of the read/modify/write processing (S173), and then ends this read processing.

As a result of the foregoing processing, although write processing will be performed to all logical units during the read/modify/write processing, since the logical unit LU to perform read/modify processing and the logical unit LU to perform read processing will be separated, roles are shared by each logical unit LU, and it is possible to efficiently perform the load balancing of the logical unit LU.

(1-2-9) Mirror Release Operation of Mirrored Logical Unit LU

Figure 12:
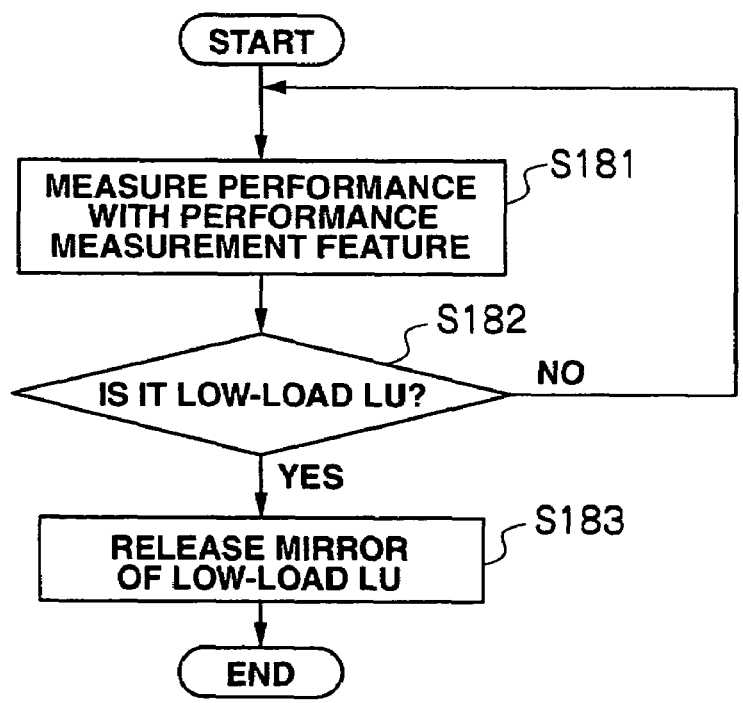
FIG. 12 is a flowchart showing the mirror release operation of the logical unit LU during a low load after creating the mirrored logical unit LU of the storage apparatus 2 according to an embodiment of the present invention.

The mirror release operation of the logical unit LU when the storage apparatus 2 has a low load pertaining to the first embodiment of the present invention is now explained with reference to FIG. 12. FIG. 12 is a flowchart showing the mirror release operation of the logical unit LU during a low load after the creation of the copy logical unit LU of the storage apparatus according to the first embodiment of this invention.

Foremost, the CPU 10 performs host access processing to the host system 1, and performs performance measurement to the logical unit LU based on the host access processing according to the performance measurement program 12 (S181).

The CPU 10 determines whether the logical unit LU is of a low load based on the threshold value of the mirror release set in advance as a result of the performance measurement at step S181 (S182). When the CPU 10 determines at step S182 that the logical unit LU is not a low load (S182: NO), it returns to step S180. Meanwhile, when the CPU 10 determines at step S182 that the logical unit LU is a low load (S182: YES), it releases the mirror of the logical unit LU of the low load in the backup physical volume VOL (S183), and then ends this processing.

As a result of the foregoing processing, even when the logical unit LU in the backup physical volume VOL is copied, the mirror of the logical unit LU that became a low load status will be released, and it will be possible to operate with only the logical unit LU in the physical volume VOL.

Figure 13:
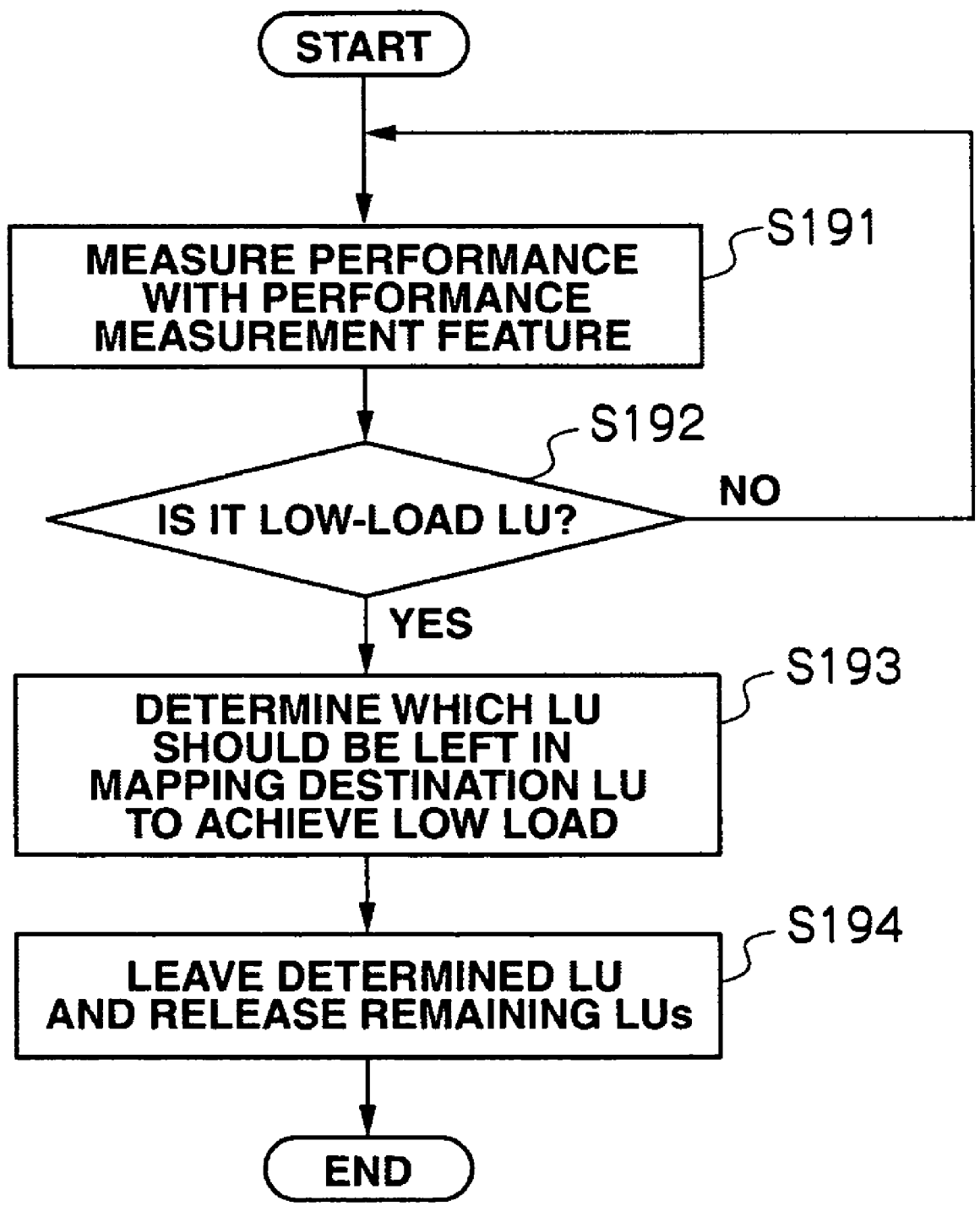
FIG. 13 is a flowchart showing the mirror determination operation of the logical unit LU and the release operation of the mirrored logical unit LU during a low load after creating the copy LU of the storage apparatus according to an embodiment of the present invention.

The case of adding the determination of leaving which logical unit LU in the mirror release operation of the logical unit LU during a low load of the storage apparatus pertaining to the first embodiment of the present invention is now explained with reference to FIG. 13. FIG. 13 is a flowchart showing the operation of releasing the mirror of the logical unit LU upon adding the determination of which logical unit LU to leave during a low load after creating the copy LU of the storage apparatus according to the first embodiment of this invention.

Foremost, the CPU 10 performs host access processing to the host system 1, and determines whether the logical unit LU is of a low load based on the threshold value of the mirror release set in advance as a result (S191) of the performance management that is the same as step S181 (S192). When the CPU determines that at step S192 that the logical unit LU is not of a low load (S192: NO), it returns to step S190.

Meanwhile, when the CPU 10 determines at step S192 that the logical unit LU is of a low load (S192: YES), it determines which logical unit LU to leave and which other logical unit LU should be released in order to achieve the highest performance (S193), leaves one logical unit LU based on the determination results, releases the mirror of other logical units LU (S194), and then ends this processing.

The logical unit LU determined to be left does not necessarily have to be the logical unit LU of the copy source in which a mirror was created. In other words, it is possible to delete the logical unit LU of the copy source in the physical volume VOL, and leave the mirrored logical unit LU in the backup physical volume VOL. Thereby, it is possible to comprehensively determine the load of the overall logical unit LU and leave the most efficient logical unit LU. Thus, it is possible to perform dynamic load balancing or performance acceleration more flexibly.

(1-3) Effect of First Embodiment

According to the foregoing configuration, even in a case of performing the read/modify/write operation in the storage apparatus 2, it is possible perform dynamic and flexible load balancing and performance acceleration.

(2) Second Embodiment

In the first embodiment, an example was explained of performing load balancing processing by measuring the load status with the overall logical unit LU as the unit regarding the logical units LU in the physical volume VOL and the logical units LU in the backup physical volume VOL.

In the second embodiment, an example is explained where the logical units LU are divided by an address, and the load status is measured with the divided logical units LU as the unit. For example, the division is a logical unit for allocating the database storage extent, and this is performed in units such as extents configured from a plurality of consecutive data/blocks.

In other words, this kind of extent unit is used to divide the logical units LU, a part of the logical unit LU measured to have the lowest load is accessed, and only a part of the logical unit LU of the corresponding overload is copied to a part of the logical unit LU of the backup physical volume VOL so as to perform load balancing of the relevant portion. As a result of performing this kind of load balancing, it is possible to perform further flexible and dynamic load balancing or performance acceleration in comparison to performing load balancing with the overall logical unit LU as the unit.

For example, the logical units LU provided to the physical volume VOL are divided in extent units. In other words, as shown in FIG. 14, the logical unit LU0 is divided into a logical unit LU0A, a logical unit LU0B and a logical unit LU0C. Further, the logical unit LU1 is divided into a logical unit LU1A, a logical unit LU1B and a logical unit LU1C. Moreover, the logical unit LU2 is divided into a logical unit LU2A, a logical unit LU2B and a logical unit LU2C.

After dividing the logical units LU as described above, the load status of the logical units LU is measured based on the performance measurement program 12 for each divided unit. Based on the measured results, each divided unit of the logical units LU; that is, only a part of the logical unit LU is copied to a part of the logical unit LU set in the backup physical volume VOL, and a mirrored logical unit LU is created in a part of the logical unit LU.

Incidentally, the logical unit LU may be divided into an arbitrary number that is 3 or less or 3 or more according to the size of the unit, and the logical unit LU may be divided by using an arbitrary unit other than the extent.

According to the foregoing configuration, even in a case when the load of a part of the logical unit LU in the storage apparatus 2 becomes high, it is still possible to perform dynamic and flexible load balancing or performance acceleration.

(3) Other Embodiments

Although an invention devised by the present inventors has been specifically explained based on embodiments, the present invention shall not be limited to such embodiments, and, needless to say, the present invention may be subject to various modifications within a scope that will not deviate from the gist of this invention.

For example, in the foregoing embodiments, although a case was explained where the performance measurement operation is performed with software processing using the performance measurement program 12, the present invention is not limited thereto, and, for instance, this may be performed with hardware processing using a CPU or the like.

Moreover, in the foregoing embodiments, although a case was explained where the copy operation of the logical unit LU is performed with software processing using the copy program 13, the present invention is not limited thereto, and, for instance, this may be performed with hardware processing using a CPU or the like.

Further, in the foregoing embodiments, although a case was explained where the physical volume VOL and the backup physical volume VOL as physical storage extents are provided by a plurality of physical disk drives as memory devices, the present invention is not limited thereto, and a semiconductor memory such as a flash memory may be used as the memory device.

We claim:

1. A storage apparatus, comprising:
   a storage unit providing a preliminary physical volume thereof and at least one backup physical volume thereof for storing data transmitted from a higher-level device, each of the preliminary and backup physical volumes being formed by a plurality of physical disks; and
   a control unit for controlling reading and writing of data from and in a logical volume mapped to at least one physical disk of said preliminary physical volume in response to a read request and a write request from a higher-level device;
   wherein said control unit measures the load status of said logical volume based on a data amount and a command throughput transferred between said higher-level device and said storage unit,
   copies contents of said logical volume from said physical disk of said preliminary physical volume to one or more backup logical volumes mapped to some physical disks of said backup physical volume based on the measurement results of the load status of said logical volume when a load of said logical volume exceeding a default value, associates said logical volume mapped to said preliminary physical volume with said backup logical volumes mapped to said backup physical volume as one virtual volume, and provides said virtual volume to said higher-level device, and
   when a write request involving read processing for reading data from said virtual volume is given from said higher-level device, reads said data from one of said logical volume and said backup logical volumes associated with said virtual volume and writes data from said higher-level device in all said logical volume and said backup logical volumes associated with said virtual volume, and when a read request for reading data from said virtual volume is given, reads corresponding data from one of said logical volume and said backup logical volumes that is associated with said virtual volume and not subject to a most recent read processing.

2. The storage apparatus according to claim 1, wherein said read processing of data accompanying said write request is read/modify/write processing of reading necessary data from said one of said logical volume and said backup logical volumes before writing data from said higher-level device, processing or modifying said data and thereafter writing said data in said one of said logical volume and said backup logical volumes.

3. The storage apparatus according to claim 2, wherein necessary data is read from said one of said logical volume and said backup logical volumes, said data is processed or modified, and thereafter said processed or modified data are all written in said logical volume and said backup logical volumes.

4. The storage apparatus according to claim 1, wherein when the load of said logical volume falls below said default value, said one of said logical volume and said backup logical volumes are released from being associated with said virtual volume.

5. The storage apparatus according to claim 1, wherein said control unit reads said data from one of said logical volume and said backup logical volumes that is associated with said virtual volume and has a lowest load.

6. The storage apparatus according to claim 1, wherein said control unit reads said data from two or more of said logical volume and said backup logical volumes associated with said virtual volume in a distributed manner.

7. A control method of a storage apparatus which provides a preliminary physical volume thereof and at least one backup physical volume thereof for storing data transmitted from a higher-level device, each of the preliminary and backup physical volumes being formed by a plurality of physical disks, and controls reading and writing of data from and in a logical volume mapped to at least one physical disk of said preliminary physical volume in response to a read request and a write request from a higher-level device, comprising the steps of:

measuring the load status of said logical volume based on a data amount and a command throughput transferred between said higher-level device and said storage unit;

copying contents of said logical volume from said physical disk of said preliminary physical volume to one or more backup logical volumes mapped to some physical disks of said backup physical volume based on the measurement results of the load status of said logical volume when a load of said logical volume exceeding a default value, associating said logical volume mapped to said preliminary physical volume with said backup logical volumes mapped to said backup physical volume as one virtual volume, and providing said virtual volume to said higher-level device; and when a write request involving read processing for reading data from said virtual volume is given from said higher-level device, reading said data from one of said logical volume and said backup logical volumes associated with said virtual volume and writing data from said higher-level device in all said logical volume and said backup logical volumes associated with said virtual volume, and when a read request for reading data from said virtual volume is given, reading corresponding data from one of said logical volume and said backup logical volumes that is associated with said virtual volume and not subject to a most recent read processing.

8. The storage apparatus control method according to claim 7, wherein said read processing of data accompanying said write request is read/modify/write processing of reading necessary data from said one of said logical volume and said backup logical volumes before writing data from said higher-level device, processing or modifying said data and thereafter writing said data in said one of said logical volume and said backup logical volumes.

9. The storage apparatus control method according to claim 8, wherein at said reading and writing step, necessary data is read from said one of said logical volume and said backup logical volumes, said data is processed or modified, and thereafter said processed or modified data are all written in said logical volume and said backup logical volumes.

10. The storage apparatus control method according to claim 7, further comprising a step of releasing said one of said logical volume and said backup logical volumes from being associated with said virtual volume, when the load of said logical volume falls below said default value.

11. The storage apparatus control method according to claim 7, wherein said data is read from one of said logical volume and said backup logical volumes that is associated with said virtual volume and has a lowest load.

12. The storage apparatus control method according to claim 7, wherein said data is read from two or more of said logical volume and said backup logical volumes associated with said virtual volume in a distributed manner.

* * * * *